United States Patent [19]

Suzuki

[11] Patent Number: 4,633,900
[45] Date of Patent: Jan. 6, 1987

[54] CONSTANT AIRFLOW CONTROL APPARATUS FOR AIR CONDITIONING

[75] Inventor: Hikoshiro Suzuki, Sagamihara, Japan

[73] Assignee: Topre Corporation, Tokyo, Japan

[21] Appl. No.: 709,663

[22] Filed: Mar. 8, 1985

[30] Foreign Application Priority Data

Jun. 30, 1984 [JP] Japan .................................. 59-98959

[51] Int. Cl.⁴ .............................................. F16D 17/34
[52] U.S. Cl. ....................................... 137/504; 74/107;
137/498; 137/601; 138/46; 251/228; 251/238; 251/263
[58] Field of Search ...................... 137/498, 499, 512.1, 137/601, 504, 518, 521; 138/46; 98/2; 251/228, 229, 238, 251, 263, 279; 74/107, 424.8 VA

[56] References Cited

U.S. PATENT DOCUMENTS

| | | |
|---|---|---|
| 2,878,831 | 3/1959 | Farnham et al. ...................... 137/601 |
| 2,890,716 | 6/1959 | Werder ............................. 137/512.15 |
| 3,179,125 | 4/1965 | O'Day et al. ................. 137/512.1 X |
| 3,204,664 | 9/1965 | Gorchev et al. . |
| 3,433,410 | 3/1969 | Warren, Jr. . |
| 3,592,240 | 7/1971 | Hedrick ........................... 137/601 X |
| 3,958,605 | 5/1976 | Nishizu ............................ 137/504 X |

FOREIGN PATENT DOCUMENTS

| | | | |
|---|---|---|---|
| 1237068 | 6/1960 | France ................................ 251/228 |
| 4829245 | 9/1973 | Japan . | |

*Primary Examiner*—Martin P. Schwadron
*Assistant Examiner*—Stephen M. Hepperle
*Attorney, Agent, or Firm*—Oblon, Fisher, Spivak, McClelland & Maier

[57] ABSTRACT

A constant airflow control apparatus is connected to an air duct of an air conditioning system to keep the flow rate of air fed from the air duct constant. The apparatus comprises a rectangular pressure receiving plate slidably mounted on a guide shaft extending in one direction inside a passage of a housing. The plate extends substantially at right angles to the central axis of the housing so as to block part of the cross section of the passage. The apparatus further comprises a coil spring for urging the plate against the flow of the air, and two swinging plates swingably attached to two opposite side edges of the pressure receiving plate, individually. The swinging plates are adapted to change the cross-section area of an air passage defined between the swinging plates and the inner surface of the housing in a mode represented by a quadratic curve in accordance with a rectilinear change of the pressure of the air.

5 Claims, 13 Drawing Figures

CONSTANT AIRFLOW CONTROL APPARATUS FOR AIR CONDITIONING

BACKGROUND OF THE INVENTION

The present invention relates to a constant airflow control apparatus which is disposed inside a duct of an air conditioning system and automatically adjusts the flow rate of air fed through the duct into a room to keep the air supply constant.

In an air conditioning system installed in a building, branch ducts connected to the main duct of a central air conditioner are distributed to different floors or rooms. Air from the central air conditioner is supplied to the rooms through discharge ports of the branch ducts. In an air conditioning system of this type, if the flow rate of the air is adjusted to the conditions of one room, operation of the discharge ports or change of the airflow rate in other rooms will cause variation of air pressure in the main and branch ducts, resulting in variation of the airflow rate in one room. In order to avoid such an awkward situation, each branch duct is conventionally fitted with a constant airflow control apparatus which automatically keeps the flow rate of supplied air constant even though the air pressure inside the duct varies.

One such prior art constant airflow control apparatus is disclosed in Japanese Patent Publication No. 35615/80. In this constant airflow control apparatus, a movable shaft is provided inside a case which is in the form of a rectangular tube. A pair of guide plates are hinged on one end of the movable shaft. Pressure receiving plates are individually hinged on both ends of the guide plates. Both ends of the pressure receiving plates are hinged on a bearing member for supporting the movable shaft.

This constant airflow control apparatus is so designed that a constant airflow rate is maintained on the basis of the balance between the spreading action of the two pressure receiving plates and the restoring force of a spring to compensate variations of air pressure.

In the prior art constant airflow control apparatus described above, however, the guide plates and the pressure receiving plates are coupled into a substantially rhombic configuration, so that the guide plates require a long traveling stroke. Also, the rhombic structure moves pantographically, and can extend over a long distance in the axial direction of the movable shaft. Thus, the apparatus is increased overall in length and in weight.

Moreover, the guide plates are hinged on the movable shaft, which is supported by bearings at the front and rear end portions thereof. Therefore, the slide guide portions are concentrated on the central axis of the casing, so that the weights of all of the guide plates and the pressure receiving plates are exerted on the slide guide portions, increasing friction. Further, the whole moving part is liable to be tilted by a deflected flow of incoming air, so that biased load acts on the slide guide portions to cause scuffing. Thus, the prior art constant airflow control apparatus lacks in reliability in operation under low pressure or under the influence of a deflected airflow.

SUMMARY OF THE INVENTION

The present invention is contrived in consideration of these circumstances, and is intended to provide a constant airflow control apparatus for air conditioning, reduced in overall length for miniaturization and permitting a smooth and secure operation of moving elements for higher reliability.

DETAILED DESCRIPTION OF THE PREFERRED EMBODIMENTS

One embodiment of a constant airflow control apparatus according to the present invention will now be described in detail with reference to the accompanying drawings of FIGS. 1 to 7.

Figure 1:
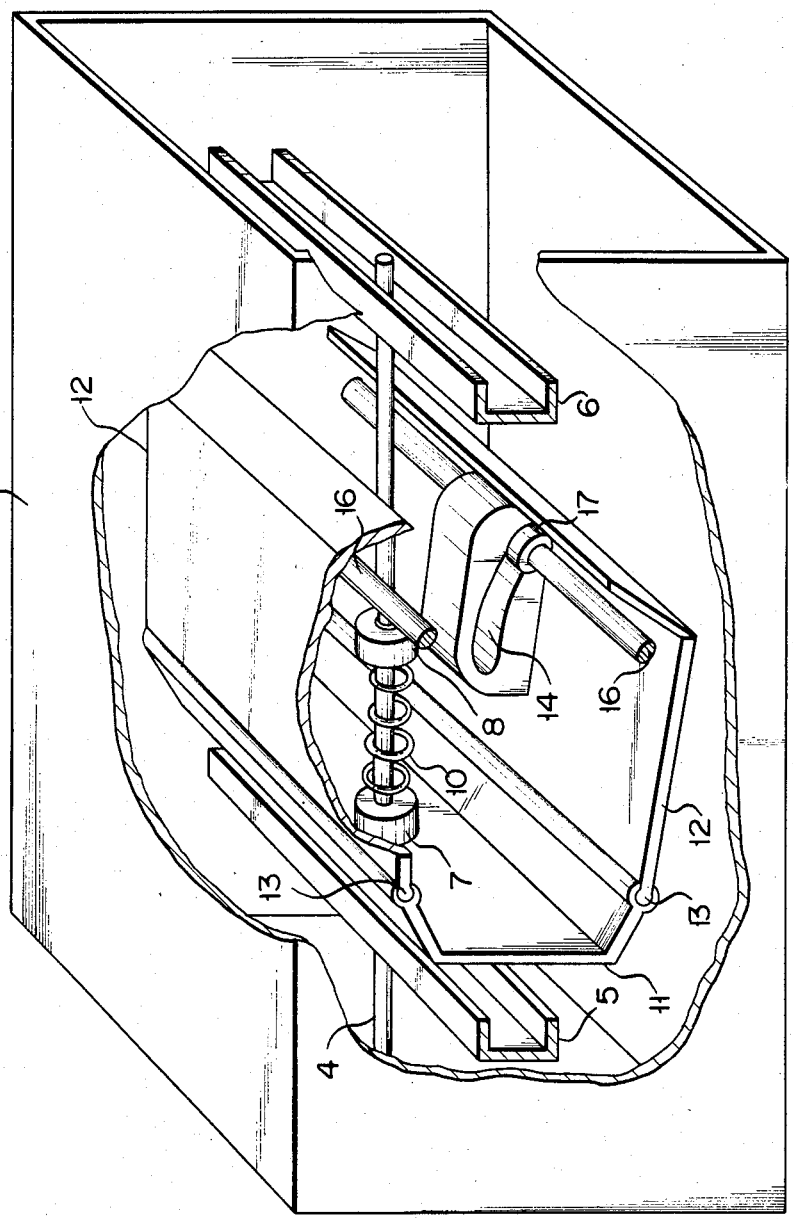
FIG. 1 is a cutaway perspective view of one embodiment of a constant airflow control apparatus according to the present invention.

In FIG. 1, numeral 1 designates a casing in the form of a rectangular tube open at both ends. The upper-course end (left-hand end of FIG. 1) of the casing 1 is connected to an upper-course side duct 2 (FIG. 2) of a branch duct, while the lower-course end (right-hand end) is connected to a lower-course side duct 3 (FIG. 2) of the branch duct. The upper-course side duct 2 communicates with a central air conditioning system (not shown) by means of a main duct (not shown), and the lower-course side duct 3 with a discharge port of a room to be air-conditioned.

Inside the casing 1, a guide shaft 4 extends on and along the central axis of the casing 1. The two end portions of the guide shaft 4 are supported individually by a pair of support frames 5 and 6 which are stretched across the casing 1. In this one embodiment, the guide shaft 4 is slidably supported along an axial direction thereof by the support frames 5 and 6.

A slide bearing 7 is slidably mounted along an axial direction thereof on that portion of the guide shaft 4 between the support frames 5 and 6. A spring bearing 8 is fixed to that portion of the guide shaft 4 between the slide bearing 7 and the lower-course side support frame 6 by means of, e.g., a cir-clip 9. A compression coil spring 10 is stretched between the slide bearing 7 and the spring bearing 8, whereby the slide bearing 7 is normally urged toward the uppercourse side.

A pressure receiving plate 11 is fixed to the slide bearing 7, substantially crossing the casing 1 at the central portion. The pressure receiving plate 11 has a predetermined pressure receiving area for air which passes through the casing 1. For example, the pressure receiving plate 11 is wide enough to block about one-half of the cross section of the passage of the casing 1.

A cir-clip 26 for defining the initial position of the pressure receiving plate 11 is fixed to that portion of the guide shaft 4 between the slide bearing 7 and the upper-course side support frame 5. Thus, if subjected to no pressure, the pressure receiving plate 11 is caused to engage the cir-clip 26 by the urging force of the coil spring 10 so that it is elastically held in position.

A pair of swinging plates 12 are swingably coupled to the upper and lower ends of the pressure receiving plate 11 by means of a pair of hinges 13, individually. Each swinging plate 12 rocks around its corresponding hinge 13 between a first position (shown in FIG. 2) in which an air passage 25 defined between the swinging plate 12 and the top or bottom wall of the casing 1 is substantially open and a second position (shown in FIG. 3) in which the air passage 25 is substantially closed. A guide plate 14 is fixed to the inside of each swinging plate 12, protruding vertically and extending along the longitudinal direction of the casing 1. Each guide plate 14 is formed with a guide slot 15 which is curved in a shape providing a second degree change in sectional area of the air passage in response to a rectilinear change in air pressure. Each guide slot 15 is penetrated by a slide pin 16 which extends horizontally and at right angles to the longitudinal direction of the casing 1. Both ends of the slide pin 16 are fixed individually to the side faces of the casing 1. A guide roller 17 is mounted on that portion of each slide pin 16 which is inserted in its corresponding guide slot 15. The guide roller 17 is in sliding or rolling contact with the peripheral edge of its corresponding guide slot 15.

Figure 4:
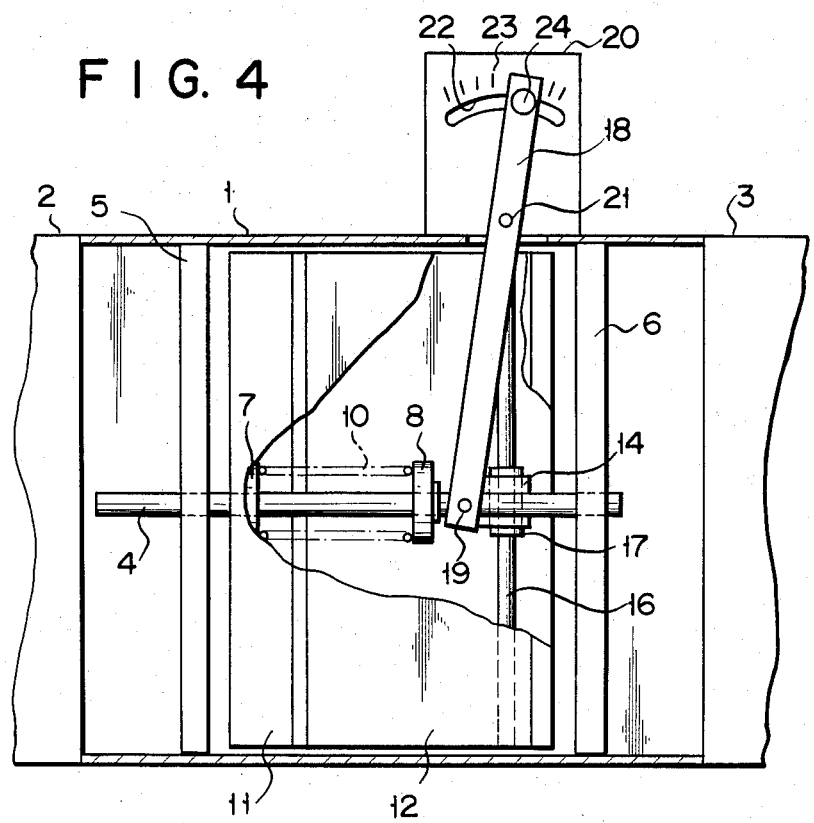
FIG. 4 is a top view showing a mechanism for setting the airflow rate.

One end of an adjusting lever 18 is coupled to the guide shaft 4 by means of a pin 19. As shown in FIG. 4, the other end of the adjusting lever 18 is led out of the casing 1 through its wall. An indicating plate 20 is fixed to that portion of the casing 1 at which the adjusting lever 18 is led out. The middle portion of the adjusting lever 18 is rockably mounted on the indicating plate 20 by means of a pivot 21. A screw 24 is attached to the distal end of the adjusting lever 18. The screw 24, which is adapted to slide inside an arcuate adjusting slot 22 in the indicating plate 20, can be fixed in a desired position. A scale 23 is put on the indicating plate 20 for the indication of an airflow rate to be set.

The operation of the constant airflow control apparatus with the aforementioned construction will now be described.

First, the adjusting lever 18 shown in FIG. 4 is rocked around the pivot 21 to set a desired airflow rate in accordance with the scale 23.

Figure 5:
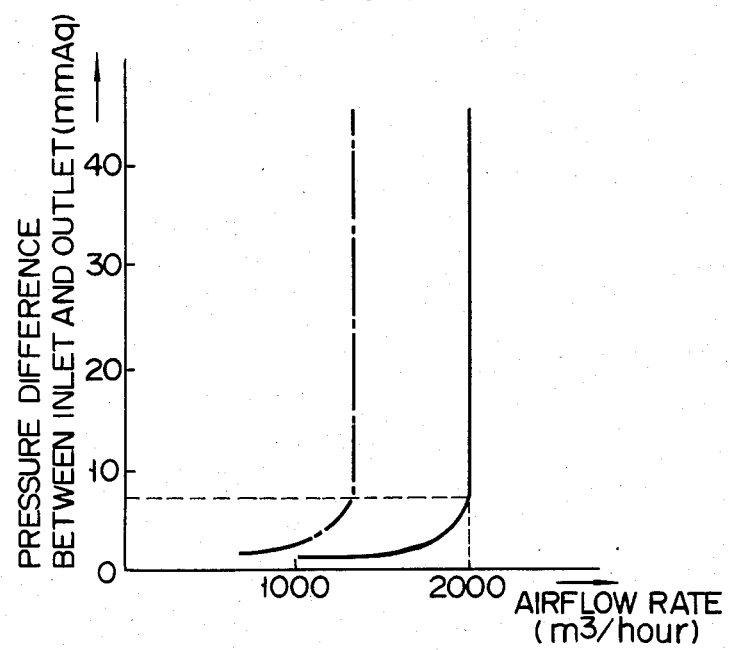
FIG. 5 is a diagram for illustrating the relationship between the airflow rate and air pressure in the first embodiment.

As the adjusting lever 18 is rocked in this manner, the guide shaft 4, which is coupled to the one end of the adjusting lever 18 by means of the pin 19, slides along the central axis of the casing 1. FIG. 5 shows an example of the details of constant airflow control. The set airflow rate ranges from 1,400 m$^3$/hour (Q2, minimum) to 2,000 m$^3$/hour (Q1, maximum). If the adjusting lever 18 is shifted for the value Q1, the air passages 25 between the swinging plates 12 and the top and bottom walls of the casing 1 are opened to their full width.

Figure 2:
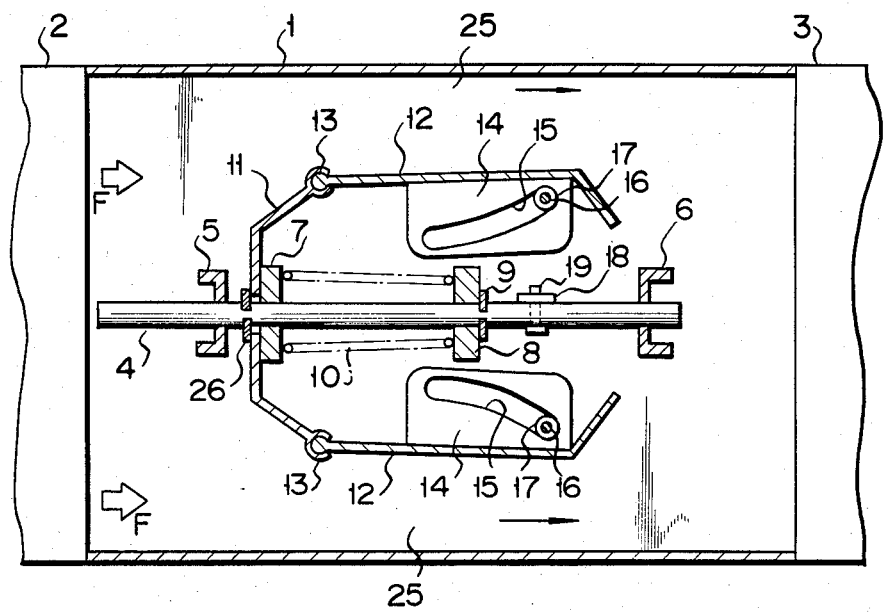
FIGS. 2 and 3 are side sectional views showing the constant airflow control apparatus of FIG. 1 under the minimum and maximum working pressures, respectively, for the maximum airflow rate.

As the adjusting lever 18 rocks in the clockwise direction of FIG. 4, the guide shaft 4 is moved to the left (toward the upper-course side). As the guide shaft 4 moves in this manner, the pressure receiving plate 11 is so biased as to engage the cir-clip 26 by the urging force of the coil spring 10. Thus, the pressure receiving plate 11 is moved together with the guide shaft 4 to the left. As the pressure receiving plate 11 moves in this manner, each swinging plate 12 rocks around its corresponding hinge 13 toward the central axis of the casing 1, with the guide roller 17 on the slide pin 16 which is fixed to each side face of the casing 1 in engagement with the guide slot 15 of the guide plate 14 which is fixed to the swinging plate 12. As a result, the swinging plate 12 is brought to the first position, as shown in FIG. 2, in which the adjusting lever 18 is so located as to indicate the maximum set airflow rate Q1.

Figure 6:
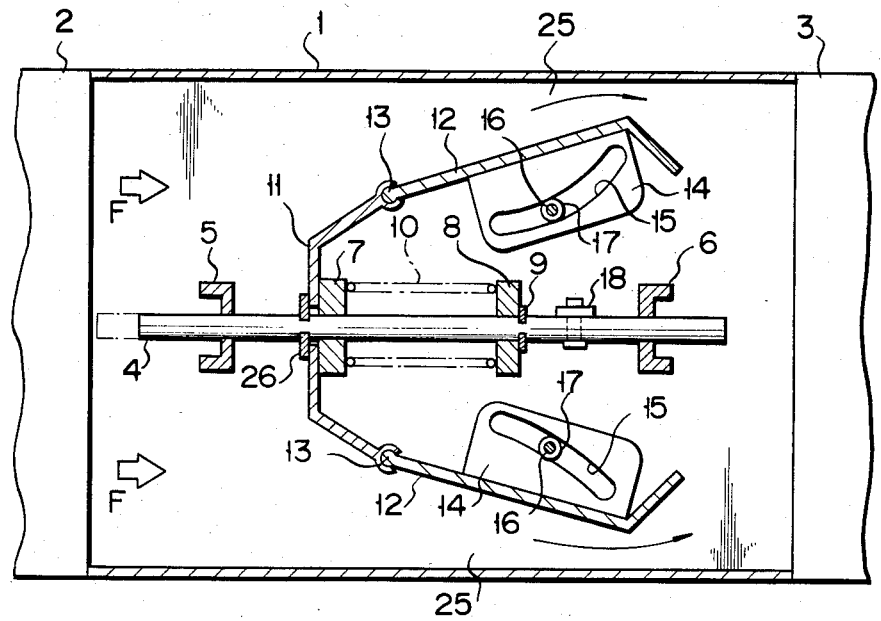
FIGS. 6 and 7 are side sectional views showing the constant airflow control apparatus of FIG. 1 under the minimum and maximum working pressures, respectively, for the minimum airflow rate.

In setting minimum airflow rate Q2, the adjusting lever 18 situated as shown in FIG. 4 is rocked counterclockwise. As the adjusting lever 18 rocks in this manner, the guide shaft 4 moves to the right, that is, toward the lower-course side. As the guide shaft 4 moves in this manner, the pressure receiving plate 11, which is so biased as to engage the cir-clip 26 by the urging force of the coil spring 10, moves together with the guide shaft 4 to the right. When the pressure receiving plate 11 moves in this way, each swinging plate 12 rocks away from the central axis of the casing 1 with each guide roller 17 in engagement with its corresponding guide slot 15. As a result, each air passage 25 is narrowed for the minimum set airflow rate Q2, as shown in FIG. 6.

Thus, the constant airflow control apparatus can freely be adjusted to a desired airflow rate.

Constant airflow control operation for maintaining the desired airflow rate set in the aforementioned manner will now be described.

Suppose that the apparatus is adjusted to the maximum airflow rate Q1, as shown in FIG. 2. When air F is fed from the upper-course side duct 2, it flows into the lower-course side duct 3 through the air passages 25 between the two swinging plates 12 and the top and bottom walls of the casing 1.

Figure 3:
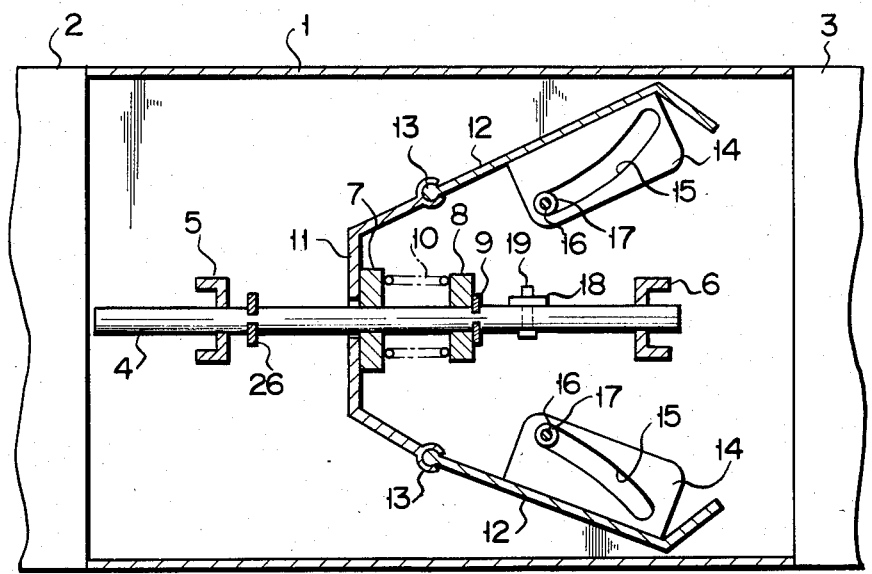

If air pressure (equivalent to the difference between the pressures at the inlet and outlet of the casing 1) increases from the minimum working pressure, the pressure receiving plate 11 slides on the guide shaft 4 toward the lower-course side against the urging force of the coil spring 10, urged by the air pressure. The slide of the pressure receiving plate 11 causes the hinges 13 of the swinging plates 12 to move also to the lower-course side. As the hinges 13 move in this direction, the swinging plates 12 rock away from each other, as shown in FIG. 3, with the guide rollers 17 in sliding contact with the guide slots 15 in their corresponding guide plates 14. As a result, the air passages 25 are narrowed to reduce the passage area, so that the airflow rate is kept constant despite the increase of the air pressure.

If the air pressure decreases from the maximum working pressure, the pressure on the pressure receiving plate 11 is reduced, so that the pressure receiving plate 11 is caused to slide toward the upper-course side by the urging force of the coil spring 10. The swinging plates 12 coupled to the pressure receiving plate 11 move toward the central axis of the casing 1, that is, toward each other, with the guide rollers 17 in engagement with the guide slots 15, so that the passages 25 are widened. In this manner, the airflow rate can be kept constant despite the decrease of the air pressure.

Thus, as indicated by the full-line characteristic curve in FIG. 5, a constant airflow rate can be maintained irrespectively of the variation of the air pressure.

Figure 7:
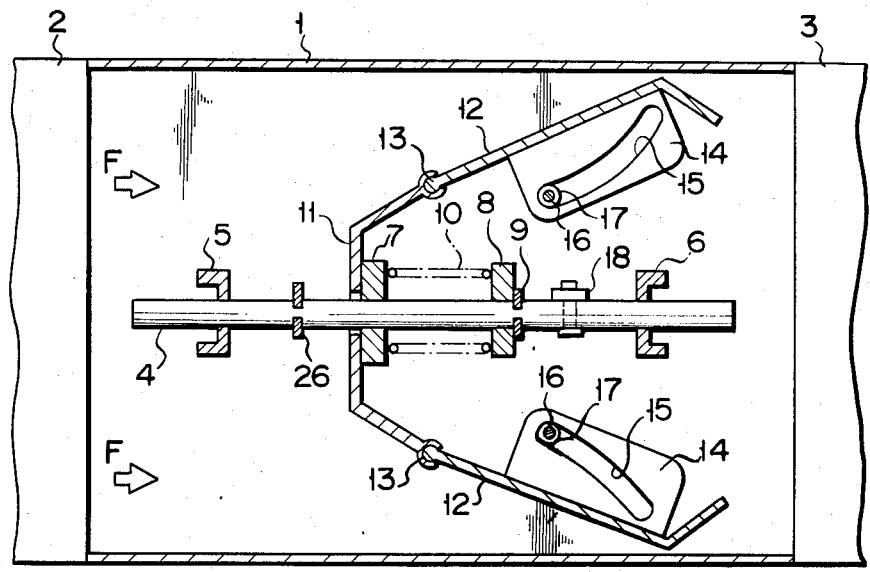
Figure 8:
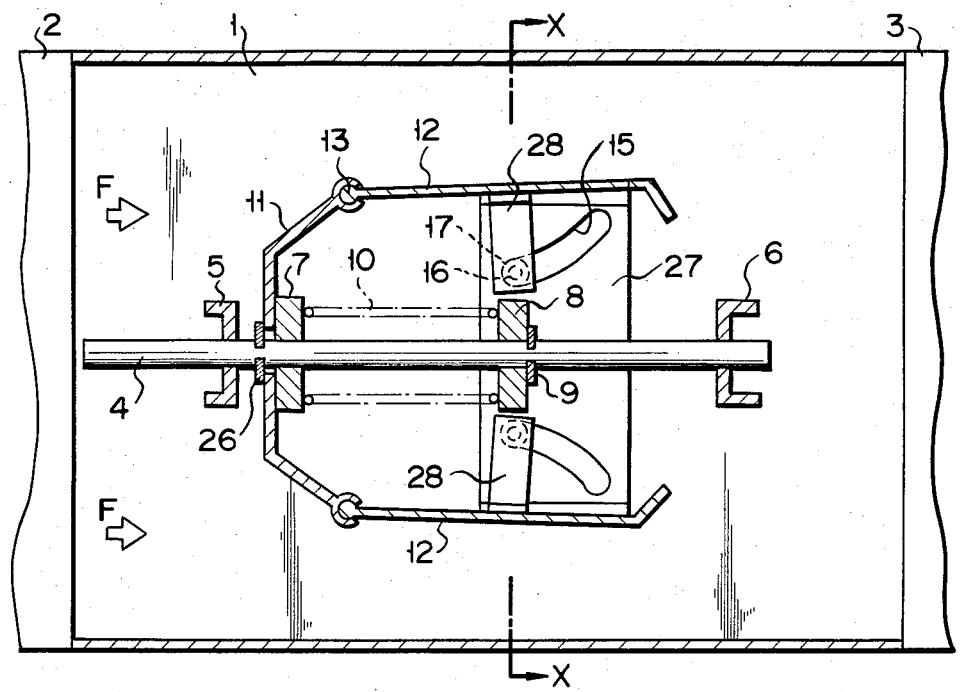
FIGS. 8 and 9 are side sectional views showing another embodiment of a constant airflow control apparatus according to the invention under the minimum and maximum working pressures, respectively.
Figure 9:
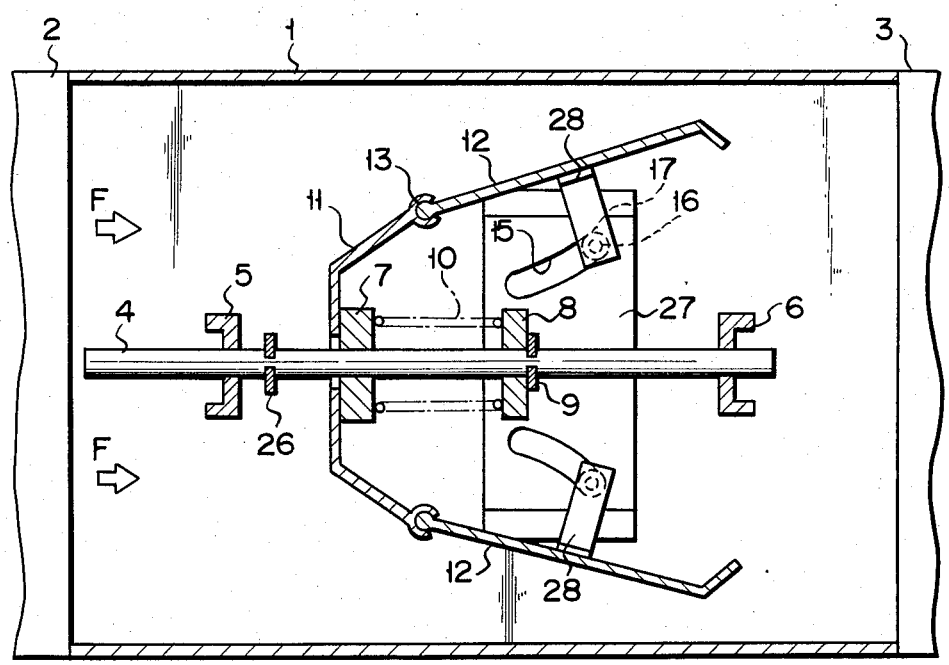
Figure 10:
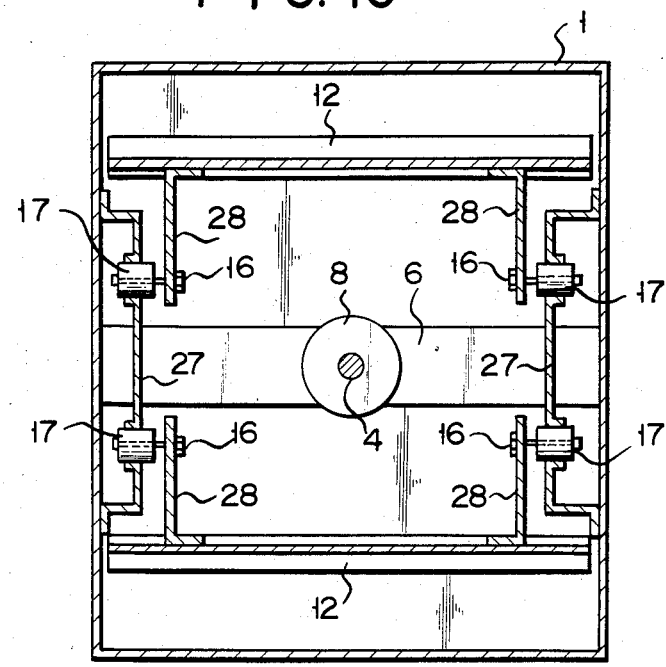
FIG. 10 is a sectional view taken along line X—X of FIG. 8.
Figure 11:
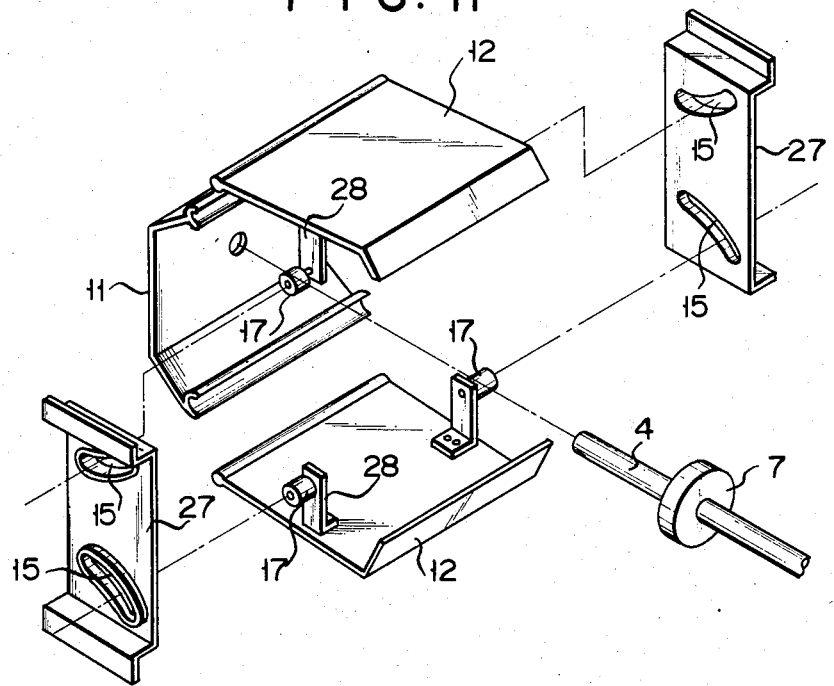
FIG. 11 is an exploded perspective view showing the constant airflow control apparatus according to the second embodiment.
Figure 12:
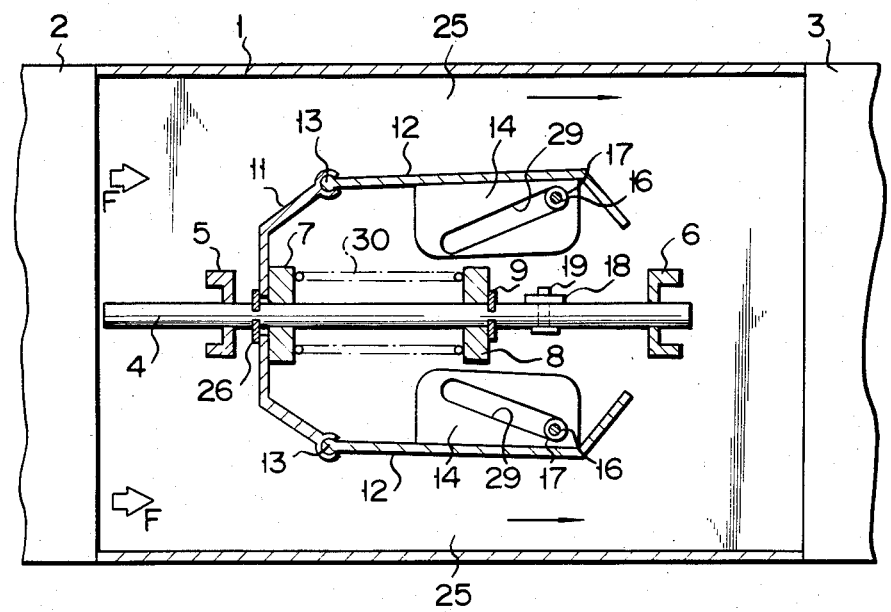
FIG. 12 is a side sectional view showing a first modified example of the constant airflow control apparatus.
Figure 13:
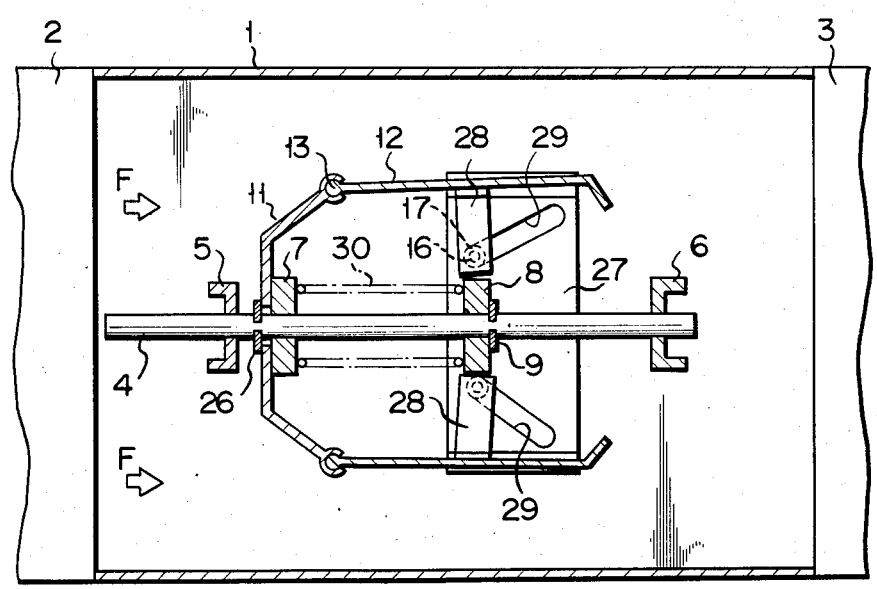
FIG. 13 is a side sectional view showing a second modified example of the constant airflow control apparatus.

In the position for the minimum airflow rate Q2 shown in FIGS. 6 and 7, as in the position for the maximum airflow rate Q1, the constant airflow control can be achieved. If the air pressure increases from the minimum working pressure (FIG. 6), the swinging plates 12 function in the same manner as in the case described in connection with FIG. 2, thereby reducing the flow area of the passages 25. If the air pressure decreases from the maximum working pressure (FIG. 7), the swinging plates 12 function in the same manner as in the case described in connection with FIG. 3, thereby increasing the flow area of the air passages 25.

Thus, the constant airflow control apparatus automatically operates so that the airflow rate, once set, is kept constant even though the air pressure is changed.

If the airflow rate, passage area and air pressure are Q, A and P, respectively, there is a relation $$Q = K \cdot A \cdot \sqrt{P}$$

where K is a coefficient. If the air pressure P is changed, the airflow rate Q can be kept constant by changing the passage area A. The constant airflow control apparatus of the present invention operates on this principle. Where the airflow rate q is constant, the passage area A is proportional to $1/\sqrt{P}$, and there is a relation $$\Delta A^2 \propto \frac{1}{\Delta P}.$$

In other words, if the air pressure is changed rectilinearly, the passage area A needs to be changed in a mode represented by a quadratic curve for the constant airflow rate. Hereupon, if the coil spring 10 is a linear spring, the rectilinear air pressure change causes the pressure receiving plate 11 to change its position rectilinearly against the urging force of the coil spring 10. For such a movement of the pressure receiving plate 11, therefore, the size of the air passages 25 need be changed in a quadratic curve degree. To attain this, the guide slots 15 in the guide plates 14 guide their corresponding swinging plates 12 so that the size of the air passages 25 change in a quadratic curve as the pressure receiving plate 11 shifts its position rectilinearly.

In the constant airflow control apparatus according to the one embodiment constructed in this manner, the moving elements including the pressure receiving plate 11 and the swinging plates 12 are supported by three portions, i.e., the slide bearing 7 and the sliding contact portions between the two guide slots 15 and their corresponding guide rollers 17. Accordingly, the load is dispersedly supported to permit a smooth slide even though the flow of incoming air is deflected. In particular, the slide pins 16 are fitted with the guide rollers 17 which are in rolling or sliding contact with their corresponding guide slots 15 with small friction, so that the operation of the swinging plates 12 can very smoothly be performed.

It is to be understood that the present invention is not limited to the arrangement of the one embodiment described above, and that various changes and modifications may be effected therein by one skilled in the art without departing from the scope or spirit of the invention.

For the regulation of the swinging position of the swinging plates 12, in the one embodiment described above, the guide slots 15 are formed in the guide plates 14 which are fixed to their corresponding swinging plates 12, and the slide pins 16 fitted in their corresponding guide slots 15 are fixed to the casing 1. Alternatively, however, the swinging position of the swinging plates 12 may be regulated by the use of a mechanism shown as another embodiment in FIGS. 8 to 11.

In the description of the second embodiment to follow, like reference numerals are used to designate like members as included in the first embodiment, and a description of those members is omitted.

In this second embodiment, a pair of guide slots 15 are formed in each of auxiliary plates 27 which are attached individually to the both side faces of a casing 1. Slide pins 16 are fixed to the respective extreme ends of stays 28 which are mounted on the inner surfaces of their corresponding swinging plates 12 and extend toward the central axis of the casing 1. As in the first embodiment, guide rollers 17 are rotatably mounted on the extreme ends of their corresponding slide pins 16. The shape of each guide slot 15 is just the same as that used in the first embodiment.

In addition, in such an arrangement of the second embodiment, the swinging position of the swinging plates 12 can be controlled in the same manner and with the same result as in the case of the first embodiment.

The constant airflow control apparatus of the present invention may also be designed for a variable version in which the spring bearing 8 can be axially shifted by means of the adjusting lever 18.

According to the present invention, as described above, swinging plates swingably mounted on a pressure receiving plate which is slid by an air pressure are guided in their swinging action by slide pins which are attached to the swinging plates or a casing and fitted in guide slots which are formed in the casing or the swinging plates. Thus, the constant airflow control apparatus of the present invention can be made shorter in overall length than a prior art apparatus with a rhombic configuration, thus enjoying a compact, lightweight design. Further, moving elements including the pressure receiving plate and the swinging plates are guided and supported dispersedly by a guide shaft and the casing. Thus, the load is dispersed to reduce friction between individual components for smooth sliding action. Even if subjected to a deflected airflow or other biased load, moreover, the constant airflow control apparatus of the invention cannot easily be tilted, and is free from scuffing or galling. Thus, the apparatus can securely be operated with improved smoothness and higher reliability even under low pressure.

What is claimed is:

1. A constant airflow control apparatus which is connected to an air duct of an air conditioning system to keep the flow rate of air fed from the air duct constant, comprising:
   a housing extending in one direction and having a passage with a rectangular cross section and openings at both ends, one of said openings communicating with the air duct;
   a guide shaft extending along a central axis of said housing inside the passage;
   a rectangular pressure receiving plate slidably mounted on the guide shaft and substantially extending at right angles to said central axis of the housing so as to block part of the cross section of the passage;

urging means for urging the pressure receiving plate against the flow of air with a force such that the pressure receiving plate moves along the guide shaft in proportion to an air pressure thereon, and gate means attached to the pressure receiving plate and adapted to change the cross-sectional area of an air passage defined between the gate means and the inner surface of the housing in a mode represented by a quadratic curve in accordance with a rectilinear change of the pressure of the air, wherein said gate means includes swinging plates swingably attached to two opposite side edges of the pressure receiving plate, individually, and shifting means for shifting the swinging plates so that the cross-sectional area of the air passage changes in a quadratic curve in accordance with the rectilinear change of the air pressure, wherein said shifting means includes guide plates protruding individually from the swinging plates toward the guide shaft, each said guide plate having a guide slot with a non-linear curve, and slide shafts penetrating their corresponding guide slots and fixed at both ends to the housing.

2. The constant airflow control apparatus according to claim 1 wherein said urging means includes a coil spring having two ends engaging the guide shaft and the pressure receiving plate, individually.

3. The constant airflow control apparatus according to claim 2, which further comprises supporting means for supporting the guide shaft so that the guide shaft is movable in said one direction, and retaining means fixed to the guide shaft and adapted to engage the pressure receiving plate urged by the urging force of the coil spring, thereby settling the initial position of the pressure receiving plate.

4. The constant airflow control apparatus according to claim 3, which further comprises setting means for setting the flow rate of the air fed from the air duct to a desired value.

5. The constant airflow control apparatus according to claim 4, wherein said setting means includes a setting lever at one end of which is pivotally mounted on the guide shaft, the other end of which is located outside the housing, and the middle portion which is rockably supported by the housing, so that the guide shaft moves in said one direction as the setting lever is rocked, when the swinging plates rock with the slide shafts in engagement with their corresponding guide slots, thereby adjusting the size of the air passages to the set airflow rate.

* * * * *